Patented July 22, 1952

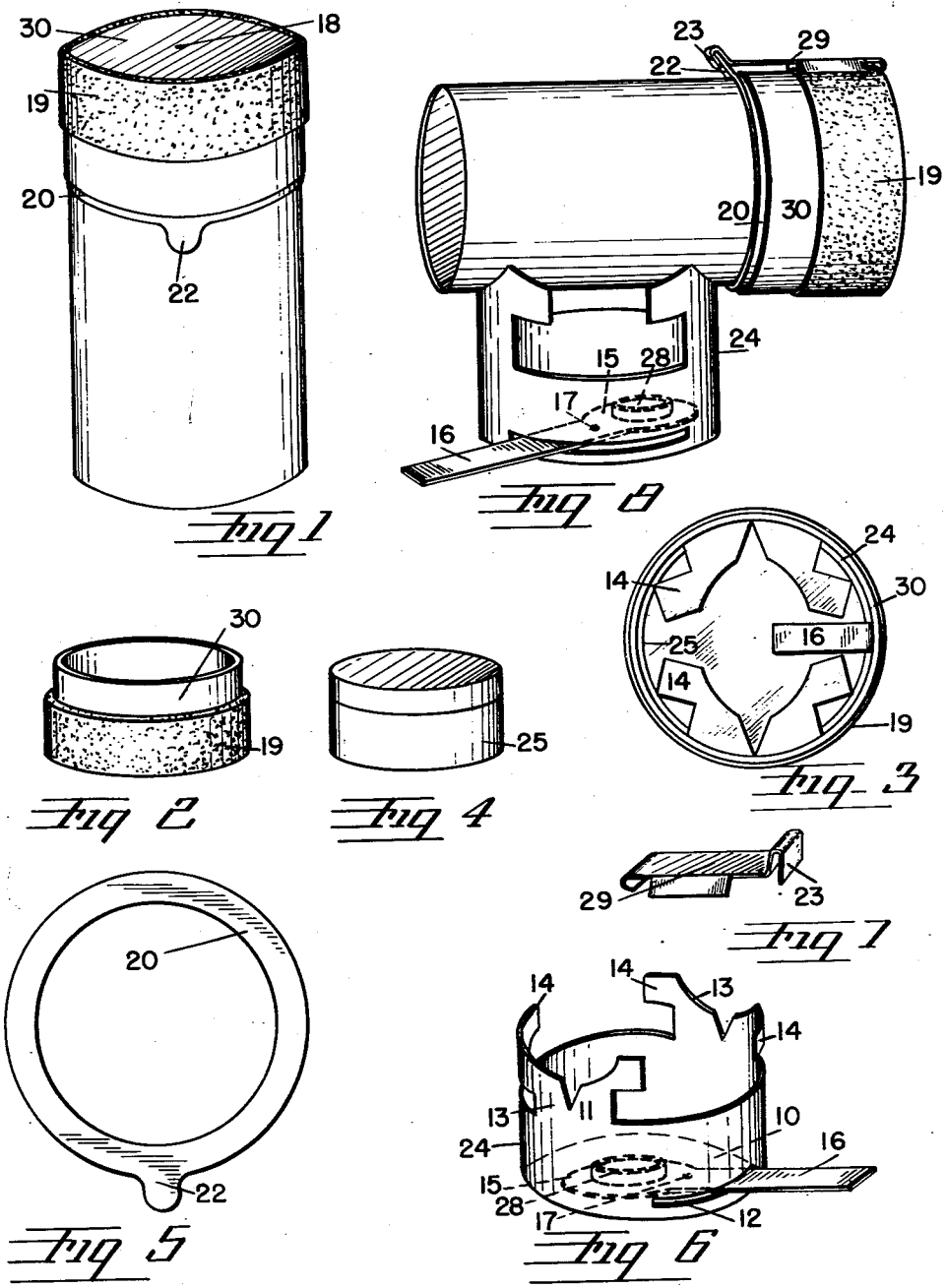

2,604,089

UNITED STATES PATENT OFFICE 2,604,089

COMBINATION FOOD CAN AND HEATER ATTACHMENT

Arnold Felix Peyser, Portland, Oreg.

Application October 28, 1949, Serial No. 124,004

2 Claims. (Cl. 126—262)

The invention relates to improvements in a heater-apparatus by which food in cans can be heated and which has following features:

A light, handy heater, equipped with a regulator for the fire and with a fuel container, always ready to use, which heats the food in the can itself without stirring and without scorching the contents; a heater which heats the food can through its cylindrical wall while the can lies on two supports in horizontal position and which permit the can to be rotated; the heater having parts set into a cap which has a form like a part of the food can and which can be attached to the food can with all parts of the heater contained therein.

The objects of my invention are to provide:

A. Better heating by heating a can in horizontal position.

B. Even heat by regulating the heat.

C. A support for a can enabling the can to be rotated so as to avoid the scorching of the contents.

D. An available heater, attached to the food can, fitted with a fuel container, ready to use, which is not bulky and light.

The following is a brief description of my invention in which description reference is made to the accompanying drawings.

In the drawings, Figure 1 is a perspective view of a food can with attached cap containing the heater before use.

Figure 2 is a perspective view of the cap attachment in which the heater and fuel are contained.

Figure 3 is a plan view of the heater, with the can supports and regulator handle in folded-in position.

Figure 4 is a perspective view of the fuel container.

Figure 5 is a plan view of the rubber ring with lip.

Figure 6 is a perspective view of the heater with the can supports set up and the regulator installed at the bottom.

Figure 7 is a perspective view of a clamp with two hooks.

Figure 8 is a perspective view of the heater, with a horizontally supported food can with attached extension-cap, rubber ring, and clamp in place during the heating.

The heater, made from light sheet-metal, has a circular bottom 10 and a circular wall 11 which has a narrow slit 12 (Fig. 6). The top of wall 11 is formed with two pairs of extensions 13, opposite to each other, having elongated lateral portions 14 and with their upper edges cut in arcuate form so as to fit the cylindrical can surface when these extensions are bent into the position shown in Figs. 6 and 8. By enabling the can to be supported in horizontal position a wider heating-surface is gained than is possible with a can in vertical position heated through its small bottom.

To prevent over-heating and scorching of the food in the can and insure proper heating throughout, the can is rotated on the heater extensions 13.

The heat regulator 15 is in the form of an arm resting on the bottom 10 of the heater, pivoted at 17 (Fig. 6), and having a handle portion 16 extending out through the slit 12 in the heater wall. A tablet 28 of solidified fuel is placed on the heat regulator as shown in Fig. 6 and the handle 16 can be used to move the burning fuel from one side to the other in the heater to provide for adjusted disposition of the heat. The food can can also be shifted longitudinally as well as rotated.

The extension cap 30 (Figs. 1, 2 and 8) is formed like a part of the food can in shape but of slightly larger diameter. One end of the extension cap is open, the other end is closed, and a small opening 18 (Fig. 1) is made in the center of the closed end. A band of insulation 19 (Fig. 1) is provided on the outside of the extension cap as protection against the heat when the can is handled during the heating. The extension cap serves as a housing for the heater and fuel container before the heater is used and can be attached to the food can by a rubber ring 20 having a lip 22.

The fuel container 25 is a flat, round metal box of a size small enough to fit inside the heater, the heater in turn fitting inside the extension cap. The fuel container is adapted to contain several tablets of solidified fuel, enough for the heating of several cans.

A clamp 29 (Fig. 7), formed with a hook at each end, is placed in the fuel container. The purpose of the clamp will be explained later.

My device is used as follows: The extension cap with the heater and fuel container therein, having originally been attached over the end of the can by the rubber ring 20, is removed from the can by pulling down on the lip 22 of the rubber ring until a portion of the rubber ring is pulled from between the can and the cap. The can and cap are then separated and the heater, indicated in general by the reference character 24, and fuel container are taken out of the cap.

The fuel container is removed from the heater and the can-supporting extensions 13 of the heater are bent into the supporting position shown in Fig. 6. A fuel tablet 28 from the fuel container is placed on the heat regulator 15. A portion of the top of the food can is opened and the extension cap is set over the partially-opened can end with the rubber ring 20 in sealing position between the rim of the cap and the can. The lip 22 of the rubber ring 20 is clamped in the larger hook 23 of the clamp, as shown in Fig. 8, and the other end of the clamp is hooked over the end of the cap. The clamp facilitates the removal of the cap after the can has been heated. With the cap in place on the partially-opened end of the can, the fuel in the heater is lighted and the can is placed on the supporting extensions of the heater as illustrated in Fig. 8. The cap is grasped at the insulation band 19 and the can is rotated slowly manually during the heating. The flame is shifted under the can to regulate and distribute the heat more evenly. The hole 18 punched in the end of the cap permits steam to escape should the heating be continued to the point where steam is generated.

When cans with entirely liquid contents are to be heated these may be heated in upright position by bending in the lateral portions 14 of the can supports 13 so that these will be within the bottom rim of the can, enabling the can to be set on the same.

I claim:

1. A heater assembly attachment for a common cylindrical can containing a product to be heated, said assembly including a cap removably attached to one end of the can, and a heater removably carried in said cap, said heater having a bottom of slightly smaller diameter than said cap in which may be placed solidified fuel, a wall on said heater bottom, and can-supporting members extending from the top edge of said heater wall which extend over into the heater when the heater is carried in said cap but which may be bent into upright position when the heater is set up and used, the top edges of said members being V-shaped to provide a pair of rests for the cylindrical can wall when said members are bent into upright position, whereby said can may be supported on said members on its side in horizontal spaced position above said heater bottom and the heating of said can may take place while said can is supported on its side.

2. A heater assembly attachment for a common cylindrical can containing a product to be heated, said assembly comprising a cap removably attached to one end of the can, and a heater removably carried in said cap, said heater having a bottom of slightly smaller diameter than said cap, a circular wall on said heater bottom, can-supporting members extending from the top edge of said heater wall which extend over into the heater when the heater is carried in said cap but which may be bent into upright position when the heater is set up and used, the top edges of said members being V-shaped to provide a pair of rests for the cylindrical can wall when said members are bent into upright position, whereby said can may be supported on said members on its side in horizontal spaced position above said heater bottom, and the heating of said can may take place while said can is supported on its side, and a movable support for solidified fuel in the bottom of said heater.

ARNOLD FELIX PEYSER.

REFERENCES CITED

The following references are of record in the file of this patent:

UNITED STATES PATENTS

| Number | Name | Date |
| --- | --- | --- |
| 825,729 | Holsboer | July 10, 1906 |
| 1,272,995 | Piotrowski | July 16, 1918 |
| 1,325,515 | Hartmann | Dec. 23, 1919 |
| 1,836,889 | Wygodsky | Dec. 15, 1931 |
| 1,953,982 | Wygodsky | Apr. 10, 1934 |

FOREIGN PATENTS

| Number | Country | Date |
| --- | --- | --- |
| 5,948 | Great Britain | of 1915 |
| 44,676 | Sweden | Oct. 30, 1918 |
| 23,310 | France | June 6, 1921 |
| | (1st addition to 524,867) | |
| 58,977 | Sweden | June 9, 1925 |
| 752,379 | France | July 17, 1933 |
| 343,241 | Italy | Sept. 19, 1936 |
| 512,024 | Great Britain | Aug. 28, 1939 |